United States Patent [19]
Kummer et al.

[11] Patent Number: 5,320,205
[45] Date of Patent: Jun. 14, 1994

[54] WEAR ADJUSTMENT FOR A CLUTCH

[75] Inventors: Martin E. Kummer, Auburn; Richard A. Flotow, Butler, both of Ind.

[73] Assignee: Dana Corporation, Toledo, Ohio

[21] Appl. No.: 975,614

[22] Filed: Nov. 12, 1992

[51] Int. Cl.⁵ ............................................. F16D 13/75
[52] U.S. Cl. ................................. 192/70.25; 192/111 B
[58] Field of Search ............... 192/70.25, 70.3, 111 B, 192/111 A, 111 R

[56] References Cited

U.S. PATENT DOCUMENTS

| | | | |
|---|---|---|---|
| 1,131,769 | 3/1915 | Borg | 192/111 R |
| 1,538,976 | 5/1925 | Denneen et al. | 192/111 R X |
| 1,753,085 | 4/1930 | Peterson | 192/111 R X |
| 1,797,515 | 3/1931 | Schoenrock | 192/70.3 X |
| 2,060,562 | 11/1936 | Fausset | 192/111 R |
| 2,207,051 | 7/1940 | Caman | 192/111 |
| 2,251,366 | 8/1941 | Miller et al. | 192/111 R X |
| 3,752,286 | 8/1973 | Sink | 192/111 |
| 4,228,883 | 10/1980 | Palmer | 192/111 A |
| 4,445,600 | 5/1984 | Schmidt | 192/18 |
| 4,549,643 | 10/1985 | Flotow et al. | 192/111 |
| 5,029,687 | 7/1991 | Asada et al. | 192/111 |
| 5,090,536 | 2/1992 | Asada | 192/70.25 |

*Primary Examiner*—Rodney H. Bonck
*Attorney, Agent, or Firm*—Gifford, Groh, Sprinkle, Patmore and Anderson

[57] ABSTRACT

An improved wear compensation device for manual or automatic adjustment for wear in a spring loaded friction clutch. An annular circumferentially extending cam track on the clutch cover or the adjusting ring or both is used to move the adjusting ring towards the clutch pressure plate when the adjusting ring is turned relative to the cover.

13 Claims, 2 Drawing Sheets

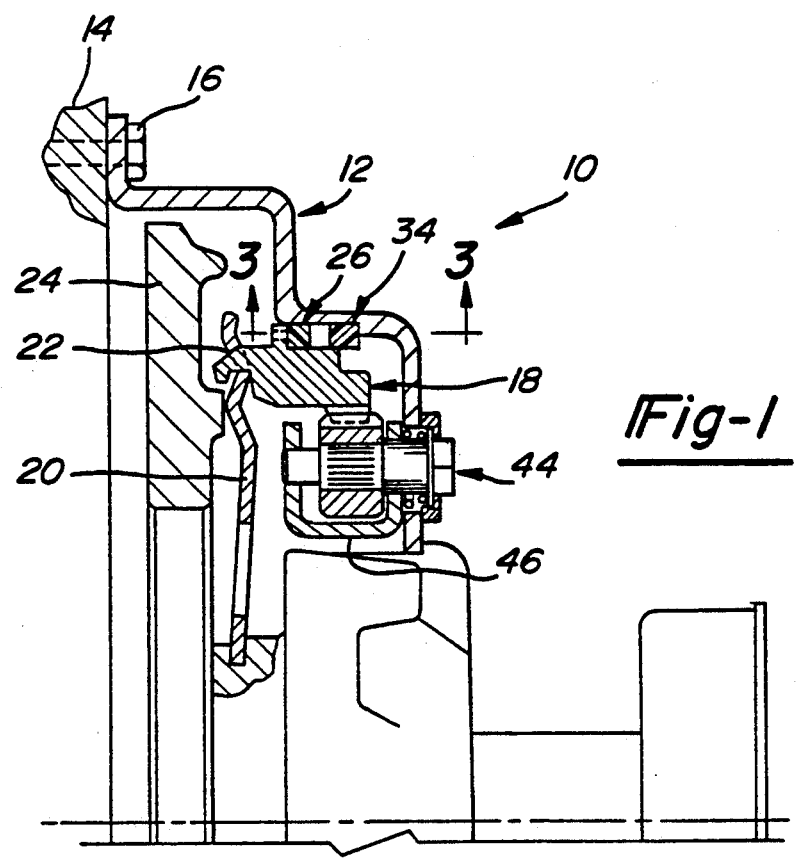
*Fig-1*
*Fig-2*
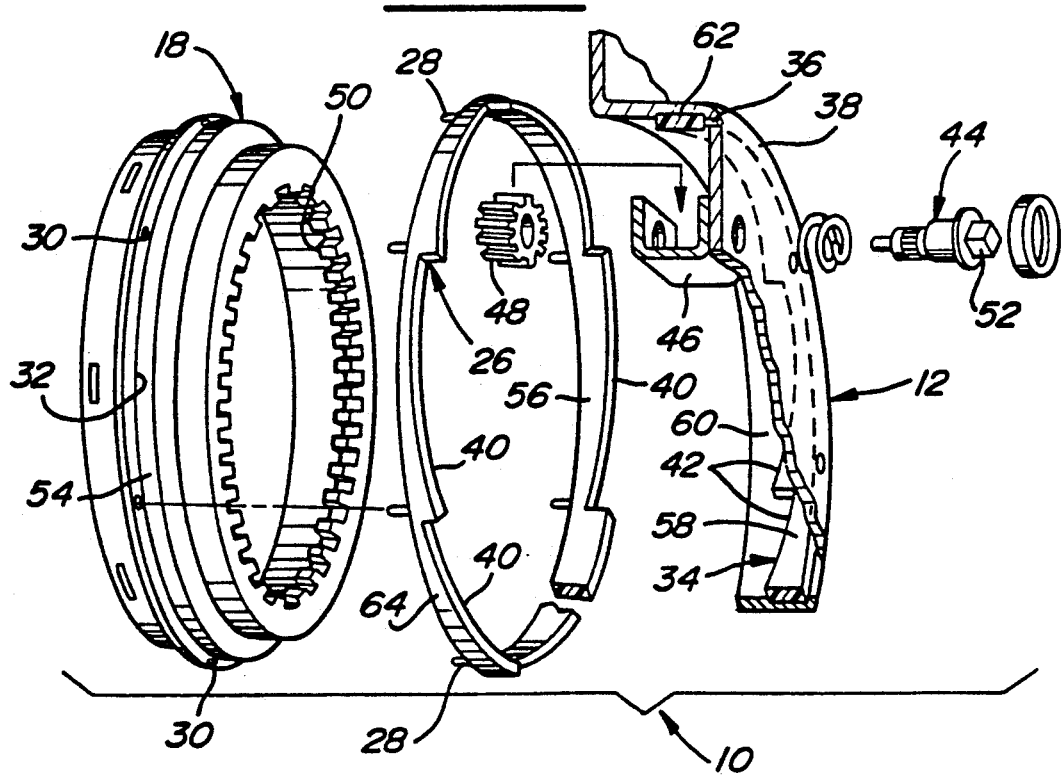

WEAR ADJUSTMENT FOR A CLUTCH

BACKGROUND OF THE INVENTION

1. Field of the Invention

This invention relates to a spring loaded friction clutch, and, more particularly, this invention relates to means for adjusting for wear in the friction surfaces of the clutch in a manual or automatic wear adjustment system.

2. State of the Art

In manual and automatic wear adjustment, compensation for wear in the friction surface is accomplished by movement of an adjusting ring, relative to the clutch cover closer to the clutch disk. Typically, actuating levers which push against the pressure plate are pivoted on the adjusting ring so that axial movement of the ring towards the pressure plate will adjust for wear. The adjusting ring is threaded at its periphery to engage threads in a flange of the cover. As the adjusting ring is unthreaded, it moves axially towards the pressure plate. Approximately ½" of axial movement of the adjusting ring is required for the full life of the clutch. This ½" of movement is equal to approximately 720° of rotation of the adjusting ring. With this arrangement, the rate of adjustment for wear can be too slow causing more slippage and, therefore, more wear. The threaded connection provides good concentricity of the parts, but the threads fret and corrode so that they often become frozen and cannot be rotated according to their original design. Grease is usually required to reduce the fretting, corrosion and wear of the threads themselves.

SUMMARY OF THE INVENTION

The present invention eliminates the threaded connection between the adjusting ring and cover along with the problems of freezing or seizing with a system which produces less wear and can be used without lubrication. The invention uses cam ramps to reduce the rotation of the adjusting ring relative to the cover to approximately 60° for the full wear travel. Preferably parts are piloted with two 360° surfaces. The parts no longer need to be threaded together but can be virtually dropped into the cover or flywheel ring, reducing assembly time.

The invention is applied to a spring loaded friction clutch having a flywheel with a cover secured to it. An adjusting ring is attached to the cover for relative rotative movement. The clutch includes a pressure plate and a series of levers having a pivotal connections to the adjusting ring for movement against the pressure plate to engage the clutch. The improvement in the wear compensation device includes an annular circumferentially extending cam track on either the adjusting ring or the cover. Preferably the cam track is included on both the cover and the adjusting ring. When the adjusting ring is rotated relative to the cover, the cam tracks cooperate to move the adjusting ring away from the cover.

Preferably both tracks are 360°. An adjusting ring cam track is fixedly mounted with the adjusting ring for sliding contact with an internal cylindrical wall of the cover, and a cover cam track is fixedly mounted to the cover for sliding contact with an external cylindrical wall of the adjusting ring, so that the internal cylindrical wall of the cover pilots the adjusting ring cam track, and the external cylindrical wall of the adjusting ring pilots the cover cam track, maintaining alignment or concentricity. The track preferably has a plurality of equally spaced cam ramps, and in one preferred form there are six cam ramps with each ramp subtending 60°.

DRAWING

The advantages of the present invention will be more apparent from the following detailed description when considered in connection with the accompanying drawing wherein:

FIG. 1 is a partial end elevation view of a clutch embodying this invention;

FIG. 2 is an exploded perspective view of the clutch of FIG. 1;

DESCRIPTION OF THE PREFERRED EMBODIMENTS

Figure 3:
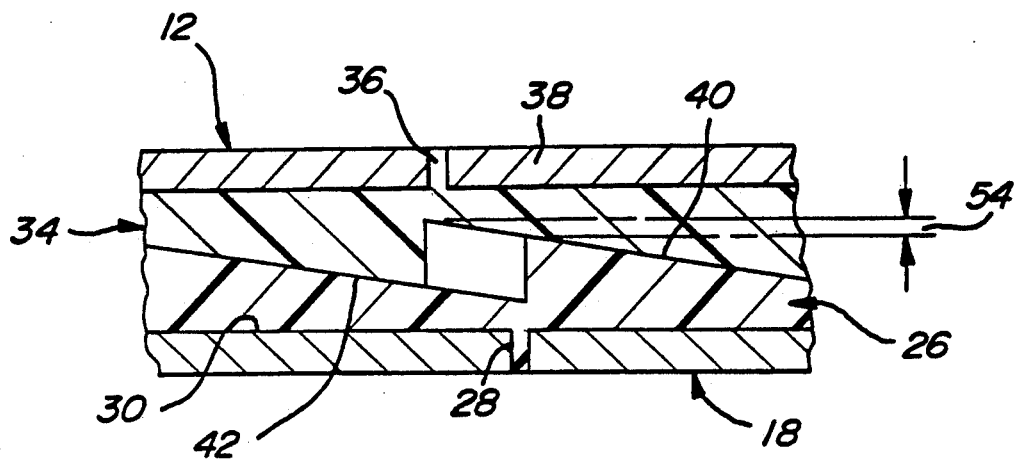
FIG. 3 is a sectional view taken along line 3—3 of FIG. 1.

Referring to FIGS. 1 and 2, a pull type, spring-loaded friction clutch 10 is shown as having a cover 12 mounted to the flywheel 14 with bolts 16. Adjusting ring 18 is slidably received in cover 12 having operating levers 20 pivotally mounted to it at 22 for actuation of pressure plate 24. Cam track 26 is mounted with pins 28 forced into apertures 30 on the radial flange 32 of the adjusting ring 18. In a like fashion matching cam track 34 is mounted with pins 36 to a radial flange portion 38 of cover 12. Cam ramps 40 on the adjusting ring cam track 26 act against cam ramps 42 on cover cam track 34.

Kwik-Adjust ® mechanism 44 is mounted in cover channel 46 with its pinion 48 in engagement with the ring gear 50 of adjusting ring 18. When wear occurs on the friction surfaces of the clutch disk (not shown) manual adjustment of the Kwik-Adjust ® device 44 is made by an end wrench engaging square head end member to rotate the pinion 48 and the adjusting ring 18 through ring gear 50. This moves the adjusting ring cam ramps 40 along the cover cam ramps 42 as shown in FIG. 3 moving the adjusting ring 18 a distance 54 towards the pressure plate 24.

With a preferred embodiment of the invention shown in FIGS. 1 and 2, there is a cam track 26 and a cam track 34 on both the adjusting ring 18 and the cover 12. This cam track is an integrally formed cam track occupying 360° with six equal rise cam ramps 40 and 42 subtending 60°. With this arrangement the full adjustment for wear will be made with a total rotation of 60° as opposed to the prior art threaded structures using 720° to 900°.

The cam tracks can be made with materials of different lubrication properties. most materials not requiring any external lubrication. While the material used for the cam tracks can range from iron and steel to a thermal plastic material, we prefer the later and have found that an aromatic polyketone thermal plastic known as PEEK which is a poly (aryl ether ether ketone) works well having a high melting point and good wear properties.

With cylindrical cam tracks, and with the tracks being backed by cylindrical surfaces on the adjusting ring and cover, there will be piloting for 360°. That is, when cam track 26 is assembled to radial flange 32 of the adjusting ring 18, the cylindrical surface 54 of the adjusting ring will be adjacent to the inner cylindrical peripheral surface 56 of cam track 26, and this cylindrical surface 54 of adjusting ring 18 will act as a centering surface with the inner peripheral cylindrical surface 58 of cam track 34. Likewise, when cam track 34 is assembled to radial flange 38 of the cover 12, the cylindrical surface 60 of the cover will be adjacent the outer cylindrical surface 62 of the cam track 34, and this cylindrical surface 60 of the cover 12 will act as a centering surface with the outer peripheral cylindrical surface 64 of cam track 26.

It will be appreciated that the angular extent of the cam ramp can be less than 60° or greater, even up to 360° for one continuous ramp. Likewise, 2-5 equally spaced ramps can be used. Also the cam tracks need not be an integral 360°, but individual ramp elements can be attached to the adjusting ring and the cover. Also the cam track can be placed on only the cover or the adjusting ring with a follower such as a spherical end element for each ramp on the other of the cover and adjusting ring.

Figure 4:
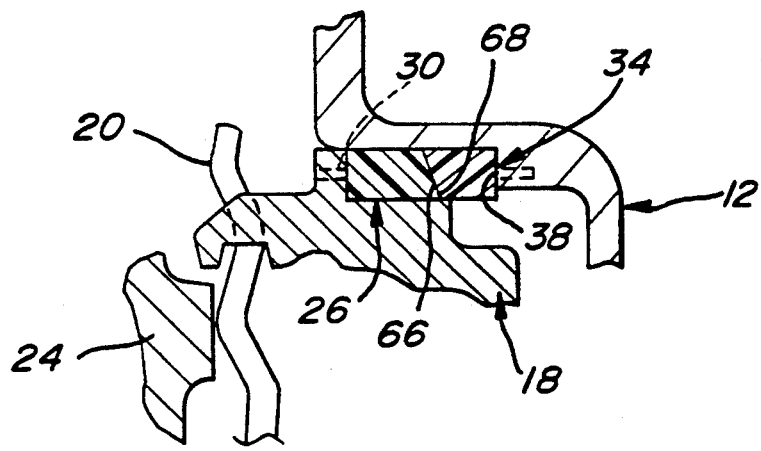
FIG. 4 is a fragmentary end elevational view showing a modification in the FIG. 1 showing.

In the embodiment of FIG. 4, the ramp surface 66 on cover cam track 34 and the ramp surface 68 on the adjusting ring cam track 26 sloped inwardly from the outer periphery to the inner periphery of the tracks so as to induce a self aligning force at the ramp surfaces.

We claim:

1. In a clutch, comprising, in combination:
a flywheel;
a cover secured to said flywheel;
an adjusting ring attached to said cover for relative rotative movement;
a pressure plate;
lever means having a pivotal connection to said adjusting ring for movement toward and away from said pressure plate for engaging and disengaging said clutch;
an improvement in a wear compensation device for moving said pivotal connection toward said pressure plate, said improvement comprising:
an annular circumferentially extending cam track on one of said cover and said adjusting ring having a planar base affixed to an annular flange on one of said cover and said adjusting ring and having a ramp surface extending axially toward the other of said cover and adjusting ring;
a cam follower on the other of said cover and said adjusting ring which cooperates with said cam track; and
wherein as said adjusting ring is rotated relative to said cover, said pivot connection is moved toward said pressure plate to compensate for wear.

2. The invention according to claim 1 wherein cooperating annular circumferentially extending cam tracks are located on said cover and said adjusting ring.

3. The invention according to claim 1 wherein said annular cam track extends 360°.

4. The invention according to claim 1 wherein said cam track includes a plurality of equally spaced, equal rise cam ramps.

5. The invention according to claim 4 wherein said cam track extends 360°.

6. The invention according to claim 5 wherein said cam track includes six cam ramps each subtending 60°.

7. The invention according to claim 5 wherein said cam track and its cam ramps are integrally formed.

8. In a clutch, comprising, in combination:
a flywheel;
a cover secured to said flywheel;
an adjusting ring attached to said cover for relative rotative movement;
a pressure plate;
lever means having a pivotal connection to said adjusting ring for movement toward and away from said pressure plate for engaging and disengaging said clutch;
an improvement in a wear compensation device for moving said pivotal connection toward said pressure plate, said improvement comprising:
an annular circumferentially extending cover cam track having a ramp surface extending axially towards said adjusting ring and having a planar base affixed to an annular flange portion of said cover;
an annular circumferentially extending adjusting ring cam track having a ramp surface extending axially toward the ramp surface of the cover cam track and having a planar base affixed to an annular flange portion of said adjusting ring; and
wherein as said adjusting ring is rotated relative to said cover, the ramp surface on said adjusting ring cam track will slide along the ramp surface on said cover cam track, moving said pivot connection toward said pressure plate to compensate for wear.

9. The invention according to claim 8 wherein the ramp surfaces on said cover cam track and said adjusting ring cam track are perpendicular to an axis of their annular circumferential extent.

10. The invention according to claim 8 wherein the ramp surfaces on said cover cam track and said adjusting ring cam track slope inwardly from an outer periphery to an inner periphery of said tracks thereby inducing a self aligning force of said ramp surfaces.

11. The invention according to claim 8 wherein a periphery of said cover cam track is adjacent a cylindrical flange portion of said cover and a periphery of said adjusting ring cam track is adjacent to cylindrical flange portion of said adjusting ring thereby keeping said cam tracks aligned.

12. The invention according to claim 10 wherein an outer periphery of said cover cam track is adjacent a cylindrical flange portion of said cover, and an inner periphery of said adjusting ring cam track is adjacent a cylindrical flange portion of said adjusting ring.

13. In a clutch, comprising, in combination:
a flywheel;
a cover secured to said flywheel;
an adjusting ring attached to said cover for relative rotative movement;
a pressure plate;
lever means having a pivotal connection to said adjusting for movement toward and away from said pressure plate for engaging and disengaging said clutch;
an improvement in a wear compensation device for moving said pivotal connection toward said pressure plate, said improvement comprising:
an annular circumferentially extending cam track having a ramp surface extending axially away from a planar base, said planar base having means for attachment to an annular flange portion of one of said cover and adjusting ring.

* * * * *